United States Patent [19]
Currle

[11] Patent Number: 5,824,432
[45] Date of Patent: Oct. 20, 1998

[54] HIGH-TEMPERATURE BATTERY

[75] Inventor: Joachim Currle, Stuttgart, Germany

[73] Assignee: Mercedes-Benz AG, Stuttgtart, Germany

[21] Appl. No.: 456,405

[22] Filed: Jun. 1, 1995

[30] Foreign Application Priority Data

Jun. 1, 1994 [DE] Germany .......................... 44 19 281.9

[51] Int. Cl.$^6$ ................................................. H01M 10/50
[52] U.S. Cl. ........................... 429/120; 429/112; 429/62; 429/72
[58] Field of Search ............................. 429/120, 26, 62, 429/112, 71, 72

[56] References Cited

U.S. PATENT DOCUMENTS

| | | | |
|---|---|---|---|
| 4,107,402 | 8/1978 | Dougherty et al. | 429/120 |
| 4,865,929 | 9/1989 | Eck | 429/120 |
| 5,169,730 | 12/1992 | Reichmer et al. | 429/20 |
| 5,432,026 | 7/1995 | Sahm et al. | 429/120 |
| 5,443,926 | 8/1995 | Holland et al. | 429/120 |

FOREIGN PATENT DOCUMENTS

3242901A1   5/1984   Germany .

Primary Examiner—Prince Willis, Jr.
Assistant Examiner—Carol Chaney
Attorney, Agent, or Firm—Evenson McKeown Edwards & Lenahan

[57] ABSTRACT

A high-temperature battery for the power supply of electrically powered vehicles is disclosed which has a thermally insulating housing and a cooling system with a cooling body which is arranged inside the thermally insulating housing. Air or other fluid coolant flows through the cooling body and is supplied through an insulating wall of the housing solely by means of coolant inlet and air outlet connecting elements arranged on the housing. The cooling body is formed by a parallel arrangement of plate-shaped cooling-body elements through which coolant flows and which are designed as hollow bodies. The bar-shaped battery cells are arranged in the space between the cooling-body elements. The coolant inlet and outlet are arranged at one side of the housing and are connected to inlet and outlet openings of the cooling-body elements so as to provide optimum cross-flow cooling power on the battery cells. Coolant in the form of air or oil can be used according to preferred embodiments.

15 Claims, 3 Drawing Sheets

HIGH-TEMPERATURE BATTERY

BACKGROUND AND SUMMARY OF THE INVENTION

The invention relates to a high-temperature battery for the power supply of electrically powered vehicles and the like, said battery including a thermally insulated housing and a cooling system including a cooling body inside said housing through which coolant flows.

For a sodium nickel chloride battery system of the type contemplated by certain preferred embodiments of the present invention, it is necessary to maintain a tightly limited temperature window of, for example 280°–350°, since, on the one hand, the battery cells should not be overheated during charging but, on the other hand, the cell temperature should not fall below a lower limit value, or else the battery loses efficiency.

In German Patent Application P 43 09 621.2-16 (corresponding to U.S. patent appliction Ser. No. 08/216,889 filed Mar. 24, 1994 now U.S. Pat. No. 5,432,026, previous to but not published before the priority date of the present application, a cooling system is described for limiting the operating temperature when charging the battery and when drawing current. A cooling body through which air flows is provided to remove heat from the battery, which cooling body penetrates the thermally insulating battery housing via an air inlet and an air outlet connecting element. The cooling body is constructed flat in the shape of a plate and is arranged on the upper side or lower side of the housing.

Cooling designs in which only the upper or lower side of the battery is cooled have the disadvantage that, because of the poor thermal conductivity of the battery cells and their large overall height a highly unfavorable temperature stratification results and it is difficult to maintain the above mentioned temperature window. It can thus occur that, on the cooled side, the cell temperature may possibly be already too low, while excessively high temperatures are established on the opposite side. Furthermore, such a cooling design has a very slow response because of the thermal inertia of the battery cells in combination with their bar-shaped construction (high in comparison to small cross-sections), since the cooling power must act over the entire height of the battery cells in order to be capable of cooling the other end of the cell as well. This cooling design is therefore unsuitable, in particular when it is desired to achieve cooling on demand, that is to say only in the case of possible overheating, as opposed to continuous cooling, since the system does not provide effective cooling response sufficiently quickly.

A high-temperature battery of the general type contemplated by the present invention is known from German Patent Document DE 32 42 901 A1, the cooling system of which is particularly suited for bar-shaped battery cells. Because of the large-area cooling along the side surfaces of the battery cells, a substantially homogeneous temperature distribution within the cells and a comparatively fast response behavior of the cooling are achieved. The counterflow principle is advantageously applied inside the cooling-body elements, as a result of which a cooling power homogeneously distributed over the effective cooling surface of the cooling-body elements is achieved.

An object of the invention is to develop a high-temperature battery such that the cooling action of the cooling system for high temperature is further improved.

This object is achieved according to certain preferred embodiments of the invention by providing an arrangement including a cooling body comprising:

a plurality of parallelly arranged plate shaped cooling body elements in the form of hollow bodies through which coolant flows, said cooling body elements being spaced from one another to form battery accommodating spaces, a coolant inlet connecting element at one side of the cooling body, a coolant outlet connecting element at said one side of the cooling body, at least one coolant inlet opening on a narrow side of each cooling body element which faces said one side of the cooling body, at least one coolant outlet opening on said narrow side of each cooling body element which faces one side of the cooling body, an inlet funnel connecting the coolant inlet connecting element with the coolant inlet openings of the cooling body elements, said inlet funnel widening in a coolant flow downstream direction in a cooling body breadth direction, and an outlet funnel connecting the coolant outlet connecting element with the coolant outlet openings of the cooling body elements, said outlet funnel narrowing in a coolant flow downstream direction in the cooling body breadth direction.

The improvement of the cooling action, related to the coolant throughput, is achieved by preferred embodiments of the invention in that the airstream through the cooling body is optimized by reducing turbulence and flow detachment.

Advantages of the invention over the prior art include that, because of the large-area cooling along the side surfaces of the battery cells, a substantially homogeneous temperature distribution within the cells and a comparatively fast response behavior of the cooling are achieved. In a particular preferred embodiment, the counterflow principle is advantageously applied inside the cooling-body elements, as a result of which a cooling power homogeneously distributed over the effective cooling surface of the cooling-body elements is achieved. Furthermore, by virtue of the preferred embodiments according to the invention, various measures are taken in order to optimize the airstream through the cooling body by reducing turbulence and flow detachment.

Other objects, advantages and novel features of the present invention will become apparent from the following detailed description of the invention when considered in conjunction with the accompanying drawings.

DETAILED DESCRIPTION OF THE DRAWINGS

Figure 1:
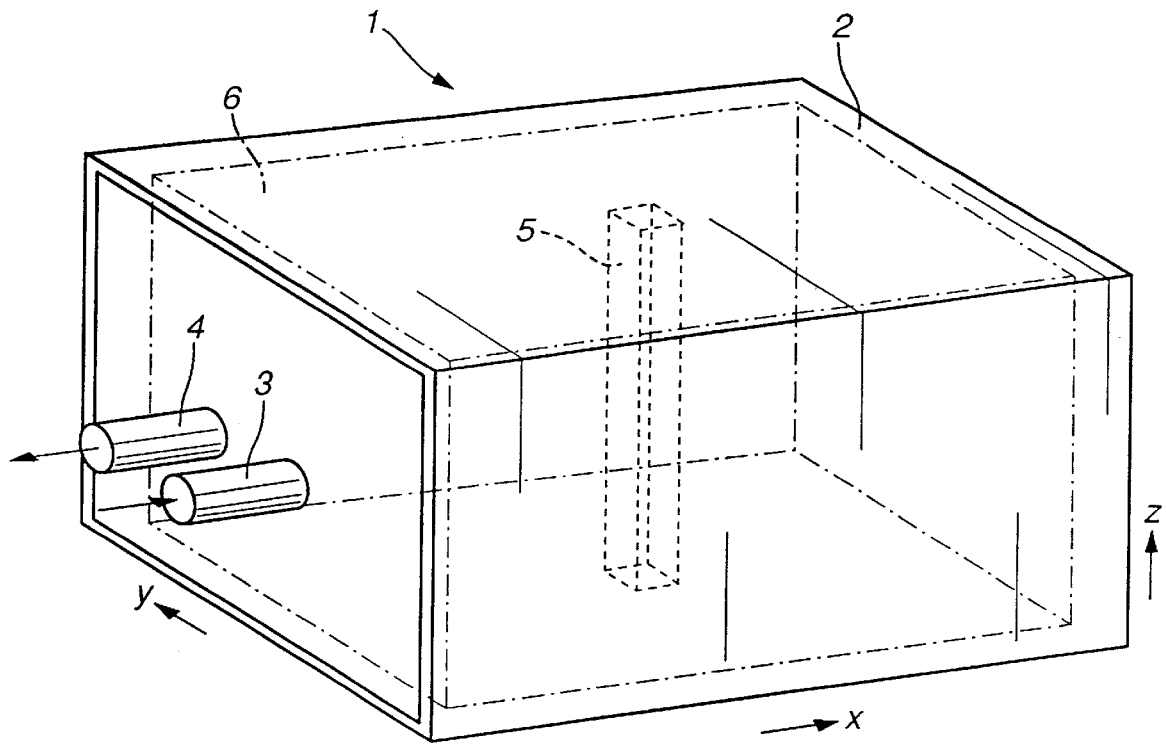
FIG. 1 is an overall schematic view of a high-temperature battery constructed according to a preferred embodiment of the invention.

The high-temperature battery represented in FIG. 1, which may be constructed on the basis of sodium nickel chloride cells, has a thermally insulating housing 2 for reducing heat losses. The insulation is generally achieved by vacuum insulation. There is a relatively large number of tightly packed bar-shaped battery cells 5 inside the housing 2, for example 13 (thirteen) in the y direction and 17 (seventeen) in the x direction, only one of which is represented as an example. The cooling body 6 according to the invention is located inside the housing 2 and is in thermal contact with the battery cells 5. In this case cold air is fed from outside through an air inlet connecting element 3 to the cooling body 6 and discharged through a corresponding air outlet connecting element 4. The air inlet and air outlet connecting elements 3, 4 have a circular cross-section and penetrate the insulating housing 2. After having passed through the cooling body 6, the heated air can be used, by means of a heat exchanger, for air-conditioning of the passenger compartment.

Figure 2A:
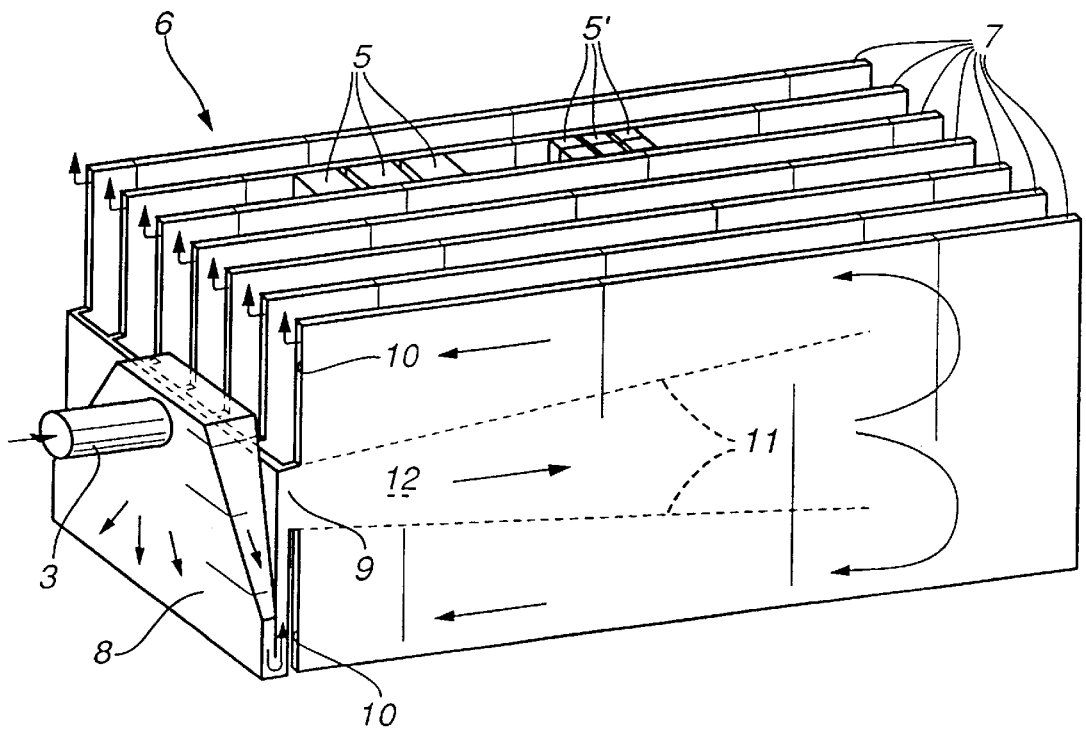
FIG. 2a is a perspective schematic view of a cooling body constructed according to the invention shown without an outlet funnel.
Figure 2B:
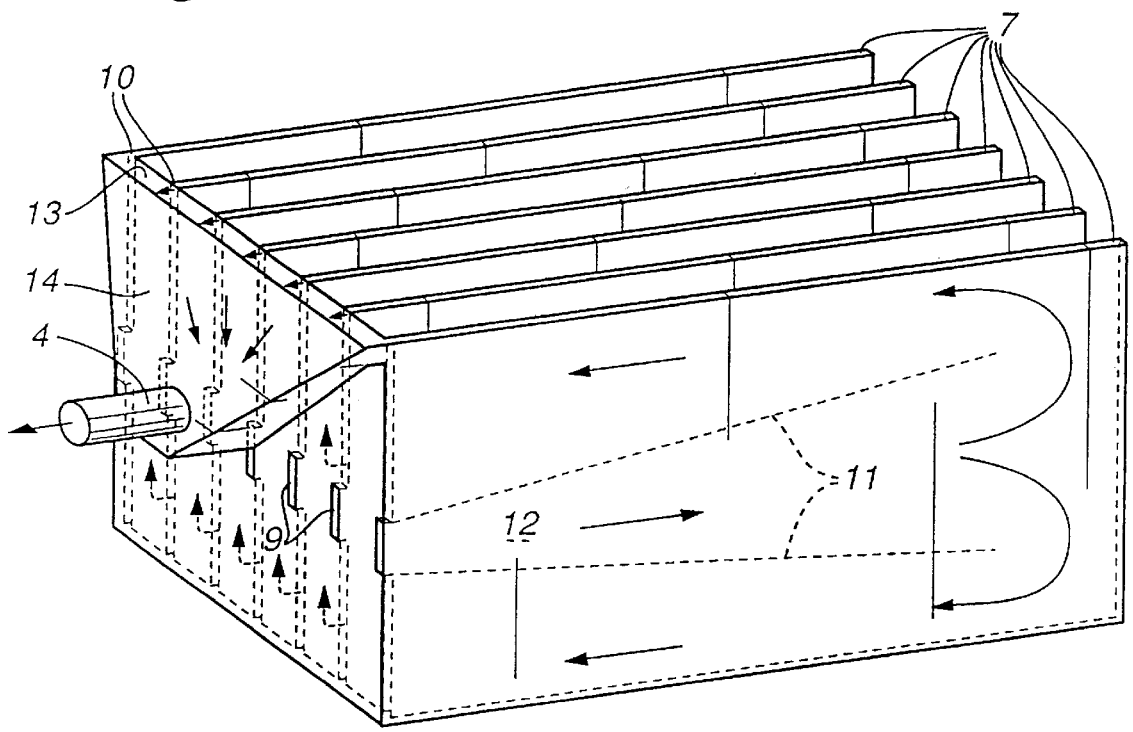
FIG. 2b is a perspective schematic view of a cooling body of the invention showing the outlet funnel but not the inlet funnel.

The cooling body according to the invention and the air guidance therethrough, illustrated by means of arrows, can be seen in FIGS. 2a and 2b.

FIG. 2a shows the cooling body 6 according to the invention, the air outlet connecting element and a corresponding outlet funnel, which collects the air flowing out, not being shown in FIG. 2a for the sake of clarity. The cooling body 6 consists of a parallel arrangement of plate-shaped cooling-body elements 7 between which, depending on the embodiment, there is one row of battery cells 5 or a double row 5'. As a result, the battery cells 5, 5' are cooled along at least one side face over a large area.

A particularly configured inlet funnel 8 serves for feeding forward the cold air from the air inlet connecting element 3 to the cooling-body elements 7 and for the greatest possible uniformity of the air inlet stream; the cross-sectional areas of the funnel 8 crossed instantaneously downwards are substantially constant along the path. Loss-inducing flow detachments are advantageously avoided thereby and a homogeneous distribution of the airstream in the breadth direction 6 is achieved.

The constant cross-sections are achieved in that the thickness (x direction) of the inlet funnel 8 narrows downwards, whereas its width (y direction) widens to the full breadth of the cooling body 6. Each cooling-body element 7 has, on its side facing the air inlet connecting element 3, a centrally arranged inlet opening 9 and two outer outlet openings 10. The inlet opening 9, through which the cold air passes into the cooling-body element 7, which is designed as a hollow body, has a substantially smaller cross-section than the outlet openings 10. This advantageously prevents the cold air, because of an excessively large available cooling surface are, being heated so strongly on the forward path through the air duct 12, which is designed as a diffuser, that no more cooling power is produced on the return path through the cooling-body element 7.

In order to achieve a diffuser action which is as optimum as possible, that is to say a homogeneous distribution and flow of the cooling air through the cooling-body elements, a plurality of air baffle plates 11 are arranged inside the cooling-body element. These form an air duct 12 which widens in the throughflow direction. The cooling air is divided at the end of the air duct 12 and, after diversion, is fed in each case to an outlet opening 10. Other arrangements of air baffle plates are, however, also conceivable, for example as they are represented in the above-referred to arrangement discussed in the background section above. The employed counter-flow principle is advantageous and important for the arrangement of the air baffle plates according to the invention, as a result of which a substantially homogeneous temperature stratification of the cooled battery cells is achieved. The counter-flow principle requires that the heated air is also discharged at the side where the cold air is fed in. The arrangement of the air baffle plates 11 which is shown in the present drawing furthermore provides the advantage that, by increasing the active cooling surface area along the air path through the respective cooling-body elements 7, the local removal of cooling power because of the heating of the air along the path is substantially compensated. A substantially homogeneous cooling power is thereby achieved over the entire effective cooling surface area of each of the cooling-body elements 7.

Figure 4:
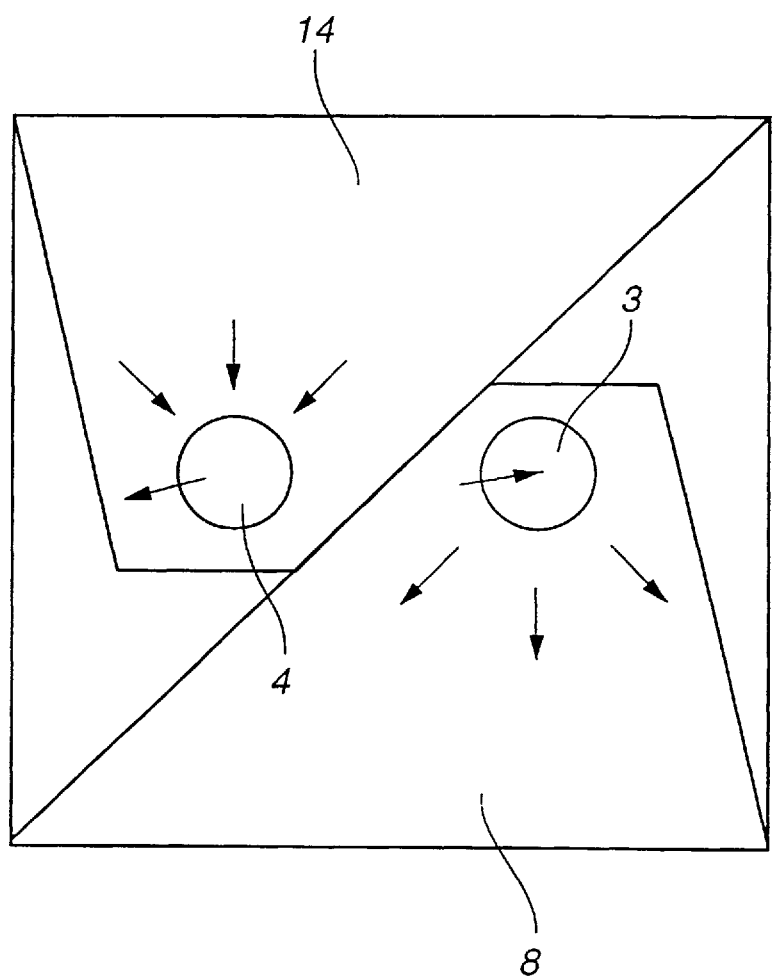
FIG. 4 is a schematic left end view of the embodiment of FIGS. 1, 2a and 2b, showing the orientation of the air inlet and outlet funnels with respect to one another.

FIG. 2b now shows, as a complement to FIG. 2a, the outlet funnel 14 which discharges the heated cold air outwards via the air outlet connecting element 4. The outlet funnel 14 has the same advantageous features as the inlet funnel 8 which was represented in the FIG. 2a but has been omitted in FIG. 2b for the sake of clarity. By virtue of the particular design of the funnels 8 and 14, the air stream is, as already mentioned, optimized and the occurring pressure loss is minimized. The two funnels 8 and 14 are arranged offset in the breadth direction, in order to exploit the overall space optimally. FIG. 4 depicts the orientation of these funnels 8 and 14. The air leaving the cooling-body elements 7 via the outlet openings 10 is first fed into an outlet chamber 13 before it is discharged via the outlet funnel 14. Since the heated air flowing out in the lower region of the outlet opening 10 flows, after diversion upwards, past the cold air flowing in via the inlet opening 9, thermal insulation, for example in the for of a thin air cushion, may advantageously be provided between the two arrangements which guide the air.

The air guidance through the cooling body 6 according to the invention is represented in summary hereinbelow with the aid of the two FIGS. 2a and 2b: the cold air enters the inlet funnel 8 via the air inlet connecting element 3. After diversion at the end of the funnel 8, the air flows through the corresponding inlet opening 9 into the respective cooling-body 7. At the end of the air duct 12, which acts as a diffuser, the air flows back in counterflow in the upper and lower region of the respective cooling-body elements 7. The air leaves the cooling-body elements 7 via the outlet openings 10 and is then fed into the outlet chamber 13, diverted at the upper end of the latter and collected in the outlet funnel 14. The air is discharged via the air outlet connecting element 4.

Figure 3:
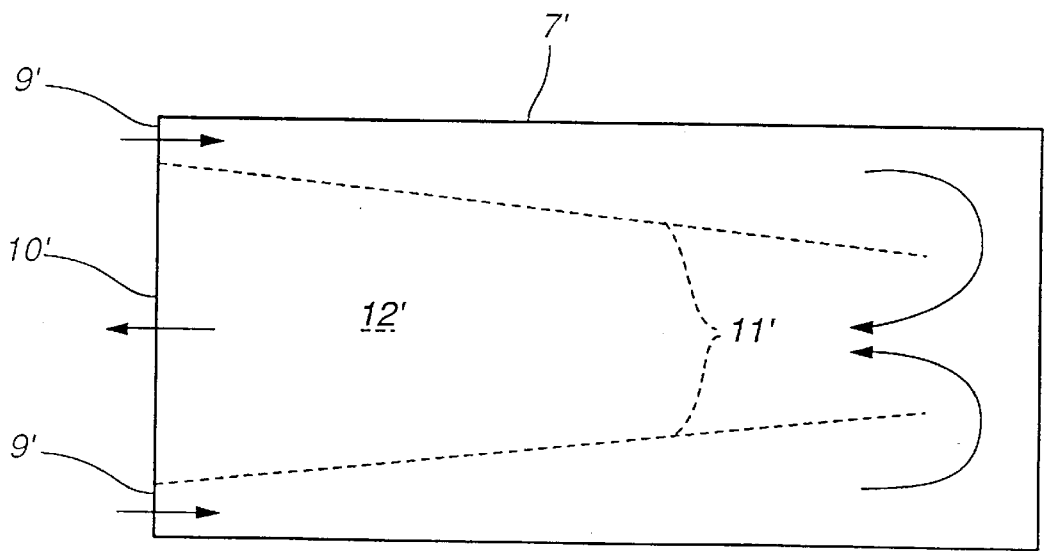
FIG. 3 is a schematic view of another embodiment of a cooling-body element constructed according to the invention.

FIG. 3 shows an alternative embodiment for a cooling-body element 7', in which the counterflow principle is used in the reverse direction. A outlet opening 10' is here arranged centrally and two inlet openings 9' are arranged above and below. Correspondingly, the air baffle plates 11' are also arranged differently, namely such that an air duct 12' which widens in the through-flow direction again results. Naturally, in the case of both embodiments of the cooling-body element 7', the supply and discharge air feed paths must be matched.

When using the technical teachings set out herein, other developments for the cooling body elements 7 are also conceivable, without further instruction, for example with a plurality of inlet and outlet openings. Furthermore, the same, or a similar, parallel arrangement of the cooling-body elements may also be derived for through-flow of the coolant in the transverse direction (y direction) and in the height direction (z direction) of the battery cells.

The cooling-body elements may, as described, be realized in a closed design or, alternatively, may be directly bounded by the lateral faces of the battery cells (open design), in which case it is necessary to adhere to a corresponding electrical insulation.

An alternative coolant, for example oil, may also equivalently flow through the cooling body instead of air according to other contemplated embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. High temperature battery for the power supply of electrically powered vehicles and the like, containing battery cells designed in the shape of a bar said battery including a thermally insulated housing and a cooling system including a cooling body inside said housing through which coolant flows, said cooling body comprising:

a plurality of parallelly arranged plate shaped cooling body elements in the form of hollow bodies through which coolant flows, said cooling body elements being spaced from one another to form battery accommodating spaces, a coolant inlet connecting element at one side of the cooling body, a coolant outlet connecting element at said one side of the cooling body, at least one coolant inlet opening on a narrow side of each cooling body element which faces said one side of the cooling body, at least one coolant outlet opening on said narrow side of each cooling body element which faces said one side of the cooling body, an inlet funnel connecting the coolant inlet connecting element with the coolant inlet openings of the cooling body elements, said inlet funnel widening in a coolant flow downstream direction in a cooling body breadth direction, and an outlet funnel connecting the coolant outlet connecting element with the coolant outlet openings of the cooling body elements, said outlet funnel narrowing in a coolant flow downstream direction in the cooling body breadth direction.

2. High-temperature battery according to claim 1, wherein the cooling body elements are disposed such that at least one long lateral face of each of battery cell designed in the shape of a bar is in thermal contact with a cooling-body element.

3. High-temperature battery according to claim 1, wherein the inlet funnel and the outlet funnel are formed perpendicularly to the cooling body breadth direction such that when the coolant flow passes through the funnels the respective instantaneously crossed cross-sectional area remains substantially unaltered.

4. High-temperature battery according to claim 1, wherein baffle plates are arranged inside each cooling-body element, which baffle plates distribute the coolant flowing in through one or more inlet openings inside the cooling-body element said baffle plates supporting diversion of the coolant flow to one or more outlet openings.

5. High-temperature battery according to claim 4, wherein the cross-sectional area crossed by the coolant at the inlet into a cooling-body element is smaller than the cross-sectional area crossed on the outlet from the cooling-body element.

6. High-temperature battery according to claim 5, wherein the baffle plates form a coolant duct which widens in the throughflow direction.

7. High-temperature battery according to claim 5, wherein on passage through the cooling-body element, the cross-sectional area instantaneously crossed in each case by the coolant flow monotonically increases.

8. High-temperature battery according to claim 6, wherein on passage through the cooling-body element, the cross-sectional area instantaneously crossed in each case by the coolant flow monotonically increases.

9. High-temperature battery according to claim 1, wherein each cooling-body element has an inlet opening arranged in a central position and two outwardly arranged outlet openings.

10. High temperature battery according to claim 5, wherein each cooling-body element has an inlet opening arranged in a central position and two outwardly arranged outlet openings.

11. High-temperature battery according to claim 1, wherein each cooling-body element has an outlet opening arranged in a central position and two outwardly arranged inlet openings.

12. High-temperature battery according to claim 5, wherein each cooling-body element has an outlet opening arranged in a central position and two outwardly arranged inlet openings.

13. High-temperature battery according to claim 1, wherein one of a coolant gas and a coolant liquid is used as the coolant.

14. High-temperature battery according to claim 13, wherein said coolant is air.

15. High-temperature battery according to claim 13, wherein said coolant is oil.

* * * * *